(12) United States Patent
Damewood et al.

(10) Patent No.: US 10,988,401 B2
(45) Date of Patent: Apr. 27, 2021

(54) PORCELAIN ENAMEL COMPOSITIONS AND COATINGS MADE THEREFROM

(71) Applicant: Prince Minerals LLC, Houston, TX (US)

(72) Inventors: Peggy Damewood, Leesburg, AL (US); Johan De Soete, Leesburg, AL (US); John Hudson, Leesburg, AL (US)

(73) Assignee: Prince Minerals LLC, Houston, TX (US)

( * ) Notice: Subject to any disclaimer, the term of this patent is extended or adjusted under 35 U.S.C. 154(b) by 0 days.

(21) Appl. No.: 15/765,411

(22) PCT Filed: Sep. 29, 2016

(86) PCT No.: PCT/US2016/054389
§ 371 (c)(1),
(2) Date: Apr. 2, 2018

(87) PCT Pub. No.: WO2017/059039
PCT Pub. Date: Apr. 6, 2017

(65) Prior Publication Data
US 2018/0290915 A1    Oct. 11, 2018

Related U.S. Application Data

(60) Provisional application No. 62/235,969, filed on Oct. 1, 2015.

(51) Int. Cl.
*C03C 8/04*    (2006.01)
*C03C 8/08*    (2006.01)
(Continued)

(52) U.S. Cl.
CPC .............. *C03C 3/066* (2013.01); *C03C 3/097* (2013.01); *C03C 8/04* (2013.01); *C03C 8/08* (2013.01); *F24C 15/005* (2013.01); *F24C 15/325* (2013.01)

(58) Field of Classification Search
CPC ..... C03C 8/04; C03C 8/06; C03C 8/08; A47J 36/025
See application file for complete search history.

(56) References Cited

U.S. PATENT DOCUMENTS

| 2,324,812 A | 7/1943 | Bahnsen et al. |
| 5,382,552 A | 1/1995 | Saad et al. |

(Continued)

FOREIGN PATENT DOCUMENTS

| EP | 1384953 A2 | 1/2004 |
| SU | 1787964 C | 1/1993 |

OTHER PUBLICATIONS

International Preliminary Report of Patentability issued in corresponding International Application No. PCT/US2016/054389 dated Apr. 3, 2018 (11 pages).

(Continued)

*Primary Examiner* — Karl E Group
(74) *Attorney, Agent, or Firm* — Osha Liang LLP

(57) ABSTRACT

A porcelain enamel composition may include a glass component including: at least one alkali oxide in an amount ranging from about 6 to 21 wt %, $SiO_2$ in an amount ranging from about 20 to 50 wt %, ZnO in an amount ranging from about 0.1 to 10 wt %, $Al_2O_3$ in an amount ranging from about 5 to 20 wt %, $B_2O_3$ in an amount ranging from about 0.1 to 20 wt %, and $P_2O_5$ in an amount ranging from about 5 to 30 wt %, all weight percentages expressed relative to the enamel composition. Methods of using such compositions and formed products are also described.

20 Claims, 5 Drawing Sheets

(51) Int. Cl.
*F24C 15/00* (2006.01)
*C03C 3/066* (2006.01)
*C03C 3/097* (2006.01)
*F24C 15/32* (2006.01)

(56) References Cited

U.S. PATENT DOCUMENTS

| | | | |
|---|---|---|---|
| 6,004,894 A | 12/1999 | Faust et al. | |
| 6,429,161 B1 | 8/2002 | Souchard et al. | |
| 6,566,289 B2 | 5/2003 | Aronica et al. | |
| 7,695,831 B2 * | 4/2010 | Shon | C03C 8/08 |
| | | | 428/432 |
| 8,367,573 B2 * | 2/2013 | Naito | C03C 3/062 |
| | | | 136/256 |
| 9,296,643 B2 * | 3/2016 | Kim | C03C 4/20 |
| 2007/0213197 A1 * | 9/2007 | Boulos | C03C 1/00 |
| | | | 501/70 |
| 2009/0311514 A1 * | 12/2009 | Shon | C03C 8/08 |
| | | | 428/325 |
| 2013/0299482 A1 * | 11/2013 | Kim | C03C 4/20 |
| | | | 219/391 |
| 2018/0170797 A1 * | 6/2018 | Gorecki | C03C 8/04 |

OTHER PUBLICATIONS

International Search Report issued in PCT/US2016/054389 dated Jan. 6, 2017 (3 pages).
Written Opinion issued in PCT/US2016/054389 dated Jan. 6, 2017 (9 pages).
Partial Supplementary European Search Report issued in European Application No. 16852574.9, dated Apr. 29, 2019 (14 pages).

* cited by examiner

PORCELAIN ENAMEL COMPOSITIONS AND COATINGS MADE THEREFROM

BACKGROUND

Technical Field

Embodiments disclosed herein relate generally to porcelain enamel compositions for use in forming a porcelain enamel coating.

Background Art

Ovens are very difficult to clean due to the frequency of food that spills or splatters onto the surface of the oven and which is subsequently baked on during cooking. Repeated cycles of spills and cooking make removal of the food/cleaning of the oven even more difficult.

Attempts to make cleaning of ovens easier generally include coatings of various types, most commonly including self-cleaning pyrolytic ground coats, non-self-cleaning ground coats, and catalytic coatings.

The self-cleaning pyrolytic ground coats enable food residue to be reduced to ash by exposure to temperatures between about 850 and 1000° F. (455 and 538° C.). However, heating oven coatings to such temperatures raises several concerns. The high temperatures necessitate extra insulation around the oven chamber and safety interlocks for oven operation and relatively large amounts of energy consumption. Further, depending upon the materials exposed to such high temperatures, concerns exist as to the possible release of toxic fumes. Fourth, the cleaning cycle used in association with these coatings takes up to three hours to complete and potentially reduces the overall service life of the oven. Further, in order to withstand multiple cleaning cycles, such enamel coatings generally contain hard, chemically-resistant frits that, without high-temperature exposure, have inherently poor release properties, thereby compounding the difficulty in removing baked-on residues.

In contrast, non-self-cleaning ground coats generally require significant cleaning efforts by the consumer and/or harsh alkaline saponifying cleaners that have a pH of approximately 14, which present significant safety concerns.

Thus, there exists a need for developments in enamels that provide for easier cleaning. Commercial products that have claimed to be easy to clean without self-cleaning or use of caustic cleaning agents have generally received poor performance reviews by consumers. Thus, a continuing need for such developments exists.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a porcelain enamel composition that includes a glass component including: at least one alkali oxide in an amount ranging from about 6 to 21 wt %, $SiO_2$ in an amount ranging from about 20 to 50 wt %, ZnO in an amount ranging from about 0.1 to 10 wt %, $Al_2O_3$ in an amount ranging from about 5 to 20 wt %, $B_2O_3$ in an amount ranging from about 0.1 to 20 wt %, and $P_2O_5$ in an amount ranging from about 5 to 30 wt %, all weight percentages expressed relative to the enamel composition.

In another aspect, embodiments disclosed herein relate to a method of forming a porcelain enamel coating on a substrate that includes depositing a layer of the porcelain enamel composition (described in the preceding paragraph) on the substrate; and firing the layer to thereby form an enamel coating on the substrate.

In another aspect, embodiments disclosed herein relate to a method of cleaning food residue from a cooking surface including a porcelain enamel coating formed from the porcelain enamel composition of the preceding paragraph, where the methods includes heating the cooking surface to a temperature of less than about 250° C. in the presence of water vapor or liquid water; and wiping the food residue off the cooking surface without application of a caustic cleaning agent.

In yet another aspect, embodiments disclosed herein relate to a cooking apparatus that includes a surface having a porcelain enamel coating thereon, the porcelain enamel coating having, at least a portion of the surface thereof, a composition measured by a non-destructive technique of $Na_2O$ in an amount ranging from about 10-20 wt %, $K_2O$ in an amount ranging from about 3-10 wt %, $Al_2O_3$ in an amount ranging from about 10-20 wt %, $SiO_2$ in an amount ranging from about 5-35 wt %, $P_2O_5$ in an amount ranging from about 10-25 wt %, ZnO in an amount ranging from about 1-5 wt, MnO in an amount ranging from about 0-2 wt % (depending on desired color), CoO in an amount ranging from about 0-5 wt % (depending on desired color), NiO in an amount ranging from about 0-5 wt % (depending on desired color), CuO in an amount ranging from about 0-5 wt % (depending on desired color), $Fe_2O_3$ in an amount ranging from about 0-8 wt % (depending on desired color), $ZrO_2$ in an amount ranging from about 0-10 wt %, $TiO_2$ in an amount ranging from about 0-3 wt % (depending on desired color and opacity), CaO in an amount ranging from about 0-2 wt %, and SrO in an amount ranging from about 0-3 wt %.

Other aspects and advantages of the claimed subject matter will be apparent from the following description and the appended claims.

DETAILED DESCRIPTION

Figure 1:
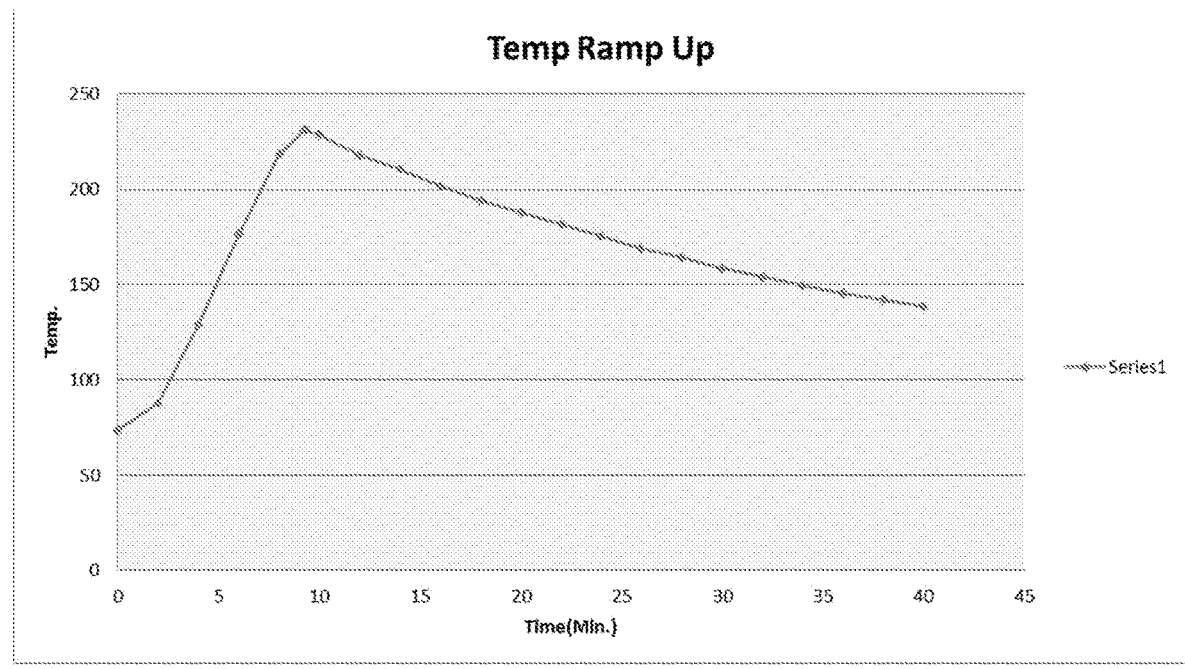
FIG. 1 shows a temperature profile for oven used during heating of the test plate in the example.
Figure 2:
FIGS. 2-5 show images of the test plate at various stages in the example.
Figure 3:
Figure 4:
Figure 5:
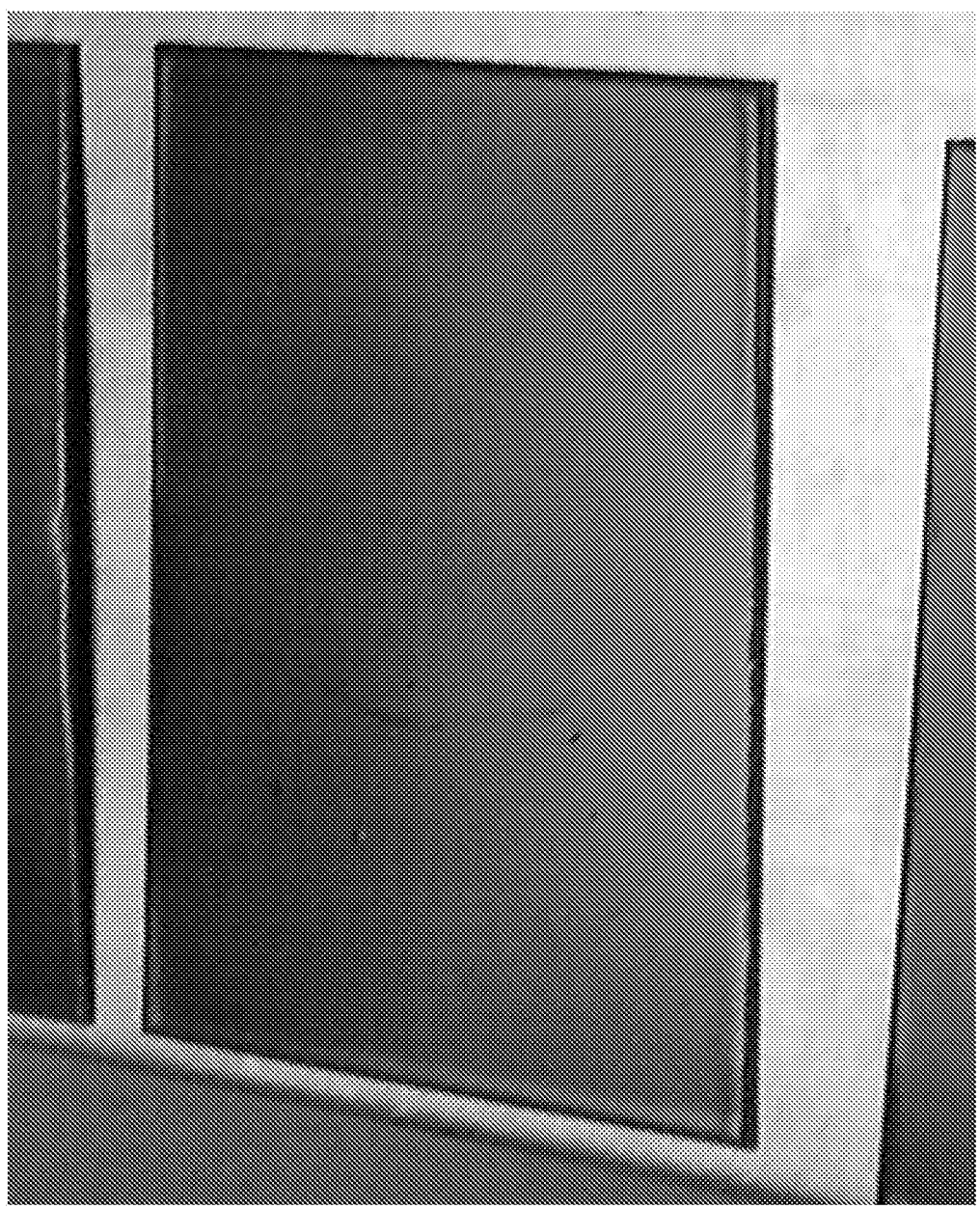

In one aspect, embodiments disclosed herein relate to porcelain enamel compositions and methods of use thereof. Specifically, embodiments of the present disclosure relate to porcelain enamel compositions for cooking surfaces that are easy to remove baked foods therefrom without the use of pyrolysis and/or caustic cleaners. Specifically, such compositions may enable baked on foods to be easily removed from the cooking surface using temperatures that are within the range of temperatures used during cooking.

In one or more embodiments, the porcelain enamel compositions of the present disclosure may be provided in the form of a dry powder, which may promote storage and enable the composition to be applied to substrates by conventional powder coating processes. However, the compositions may also be provided and applied in a wet state such as a water-based slurry.

As used herein, "porcelain" and "porcelain enamel" are broadly defined as glass materials fused to a substrate. The porcelain enamel composition may comprise frit or a glass component. The glass component includes one or more alkali oxides, silica, zinc oxide, aluminum oxide, boron oxide, and phosphorous pentoxide. The alkali oxides may be selected and present in amounts suitable to serve as a flux agent for the frit and may be selected from at least sodium oxide ($Na_2O$) and potassium oxide ($K_2O$) and optionally lithium oxide ($Li_2O$). In addition to the alkali oxides, boron oxide ($B_2O_3$) and optionally fluorine may also serve as a flux agent and may be present in an amount suitable to achieve melting of the frit. While necessary to achieve melting, the boron oxide may negatively impact acid resistance of the enamel coating. Thus, one or more metal oxides, such as ZnO and/or TiO, may be included to increase the acid resistance (counteracting the decrease in acid resistance imparted by the boron oxide). Silica ($SiO_2$) and alumina ($Al_2O_3$) both form the framework of the glass, and given lower amounts of silica, alumina (at least) may be provided as a substitute for silica. Phosphorous pentoxide ($P_2O_5$) provides the enamel composition with the cleanability properties; however, the amount of phosphorous may be selected to balance cleanability with ease in application of the enamel composition onto the metal substrate. Finally, it is also envisioned that one or more other components may be present in the glass component, including alkaline earth oxides or other metal oxides, including those added to provide color to the resulting enamel coating.

For the ranges of compositional components discussed below, the ranges are provided for the components prior to firing, as compared to an enamel coating formed on the metal substrate. In one or more embodiments, the glass component may include $Na_2O$ in an amount ranging from about 5 to about 20 wt % of the enamel composition or from about 10 to about 15 wt % in other embodiments. In yet other embodiments, $Na_2O$ may be present with a lower limit of any of about 5, 6, 7, 8, 9, or 10 wt % and an upper limit ranging from any of about 15, 17, 19, 21, 23, or 25 wt %, where any lower limit can be used in combination with any upper limit.

In one or more embodiments, the glass component may include $K_2O$ in an amount ranging from about 1 to about 15 wt % of the enamel composition or from about 3 to about 10 wt % in other embodiments. In yet other embodiments, $K_2O$ may be present with a lower limit of any of about 1, 2, 3, or 4 wt % and an upper limit ranging from any of about 8, 10, 12, 14, 16, 18, or 20 wt %, where any lower limit can be used in combination with any upper limit. Further, when considering the total amount of $K_2O$ and $Na_2O$ combined together, the combined amount may range in one or more particular embodiments from about 6 to about 21 wt % or from about 7 and 15 wt % in more particular embodiments.

In one or more embodiments, the glass component may include $Al_2O_3$ in an amount ranging from about 5 to about 20 wt % of the enamel composition or from about 5 to about 15 wt % in other embodiments. In yet other embodiments, $Al_2O_3$ may be present with a lower limit of any of about 5, 6, 7, or 8 wt % and an upper limit ranging from any of about 15, 16, 17, 18, 19, or 20 wt %, where any lower limit can be used in combination with any upper limit.

In one or more embodiments, the glass component may include $SiO_2$ in an amount ranging from about 20 to about 50 wt % of the enamel composition or from about 25 to about 35 wt % in other embodiments. In yet other embodiments, $SiO_2$ may be present with a lower limit of any of about 20, 22, 25, or 26 wt % and an upper limit ranging from any of about 35, 40, 45, or 50 wt %, where any lower limit can be used in combination with any upper limit.

In one or more embodiments, the glass component may include $P_2O_5$ in an amount ranging from about 5 to about 30 wt % of the enamel composition or from about 15 to about 20 wt % in other embodiments. In yet other embodiments, $P_2O_5$ may be present with a lower limit of any of about 5, 8, 10, 12 or 15 wt % and an upper limit ranging from any of about 20, 22, 25, 27, or 30 wt %, where any lower limit can be used in combination with any upper limit.

In one or more embodiments, the glass component may include ZnO in an amount ranging from about 0.1 to about 15 wt % of the enamel composition or from about 0.1 to about 5 wt % in other embodiments. In yet other embodiments, ZnO may be present with a lower limit of any of about 0.1, 0.5, 1, or 1.5, wt % and an upper limit ranging from any of about 5, 7, 9, 11, 13, or 15 wt %, where any lower limit can be used in combination with any upper limit.

It is also envisioned that in one or more embodiments, the total combined amount of $Al_2O_3$, $SiO_2$, $P_2O_5$, and ZnO may range from about 50 to about 75 wt % of the enamel composition or from a lower limit of any of 50, 52, 54, or 56 wt % and an upper limit of any of 68, 70, 72, or 75 wt %, where any lower limit can be used in combination with any upper limit.

In one or more embodiments, the glass component may include $B_2O_3$ in an amount ranging from about 0.1 to about 20 wt % of the enamel composition or from about 5 to about 17 wt % in other embodiments. In yet other embodiments, $B_2O_3$ may be present with a lower limit of any of about 0.1, 1, 2, 3, 4, or 5 wt % and an upper limit ranging from any of about 15, 16, 17, 18, 19, or 20 wt %, where any lower limit can be used in combination with any upper limit.

As mentioned above, $TiO_2$ may also optionally be present, such as in an amount ranging from about 0 to about 8 wt % of the enamel composition or from about 0 to about 3 wt % in other embodiments.

Other metal oxides may include those providing color, such as MnO, CoO, NiO, CuO, and $Fe_2O_3$. The compositions of the disclosure may be produced in a wide range of colors.

In one or more embodiments, the glass component may include MnO in an amount ranging from about 0 to about 5 wt % of the enamel composition or from about 0 to about 2 wt % in other embodiments. In yet other embodiments, MnO may be present with a lower limit of any of about 0.1, 0.5, or 1 wt % and an upper limit ranging from any of about 2, 3, 4, or 5 wt %, where any lower limit can be used in combination with any upper limit.

In one or more embodiments, the glass component may include CoO in an amount ranging from about 0 to about 8 wt % of the enamel composition or from about 0 to about 2 wt % in other embodiments. In yet other embodiments, CoO may be present with a lower limit of any of about 0.1, 0.5, or 1 wt % and an upper limit ranging from any of about 2, 4, 6, or 8 wt %, where any lower limit can be used in combination with any upper limit.

In one or more embodiments, the glass component may include NiO in an amount ranging from about 0 to about 5 wt % of the enamel composition or from about 0 to about 3 wt % in other embodiments. In yet other embodiments, NiO may be present with a lower limit of any of about 0.1, 0.5, or 1 wt % and an upper limit ranging from any of about 2, 3, 4, or 5 wt %, where any lower limit can be used in combination with any upper limit.

In one or more embodiments, the glass component may include CuO in an amount ranging from about 0 to about 5 wt % of the enamel composition or from about 0 to about 3 wt % in other embodiments. In yet other embodiments, CuO may be present with a lower limit of any of about 0.1, 0.5, or 1 wt % and an upper limit ranging from any of about 2, 3, 4, or 5 wt %, where any lower limit can be used in combination with any upper limit.

In one or more embodiments, the glass component may include $Fe_2O_3$ in an amount ranging from about 0 to about 8 wt % of the enamel composition or from about 0 to about 3 wt % in other embodiments. In yet other embodiments, $Fe_2O_3$ may be present with a lower limit of any of about 0.1, 0.5, or 1 wt % and an upper limit ranging from any of about 2, 3, 4, or 5 wt %, where any lower limit can be used in combination with any upper limit.

Other optional components may include $ZrO_2$. Further, in one or more embodiments, the glass component may include $ZrO_2$ in an amount ranging from about 0 to about 15 wt % of the enamel composition or from about 0 to about 5 wt % in other embodiments. In yet other embodiments, $ZrO_2$ may be present with a lower limit of any of about 0.1, 0.5, or 1 wt % and an upper limit ranging from any of about 5, 7, 9, 11, 13, or 15 wt %, where any lower limit can be used in combination with any upper limit.

In one or more embodiments, the glass component may include F in an amount ranging from about 0 to about 10 wt % of the enamel composition or from about 0 to about 5 wt % in other embodiments. When using a wet slurry application, F may optionally instead be presented as a separate additive to the glass component.

In one or more embodiments, alkaline earth oxides (such as CaO, MgO, BaO, and SrO) may be present in an amount of no more than about 3 wt %, about 1 wt % or about 0.5 wt % in other embodiments, and may be substantially free of one or more of CaO, MgO, BaO, and/or SrO in yet other embodiments. In particular embodiments, the composition is substantially free of BaO.

In any of the various aspects of the disclosure, the porcelain enamel coatings may be formed from one or more porcelain enamel compositions disclosed herein, and may be formed from a variety of enamel systems including those based on frits and powders. Formation of frits is generally known in the art, as is the formation of powders. Frits and powders, for instance, and without being bound to any particular formation method, may be formed by sintering together the various compounds of the enamel composition, followed by cooling and milling to form the frits or powders.

In some aspects, the various compounds of the enamel composition may be first blended to form a mixture. The mixture may then be placed in a high temperature furnace, such as a rotary furnace or a continuous furnace, wherein the contents are heated to above the melting temperature, typically from about 1000° C. to about 1400° C., although temperatures outside this range are within the scope of the present disclosure. The contents are held at temperature for a time sufficient to assure melting and the formation of a generally homogeneous admixture, typically from about 1 hour to about 2 hours, although melting times outside this range are within the scope of the present disclosure. In some aspects, the melt is then cooled. For a batch type process, the melt may be transferred to a quenching and drying vat, for example; for a continuous process, the melt may be passed through cooling rollers, for example. The cooled glass composition is then reduced in size, such as by passing the cooled glass from the cooling rolls through a crusher, where the glass composition is crushed to form chips or flakes having a size in the largest dimension of, typically, from about 0.1 cm to about 10 cm; when powders are desired, the chips or flakes may be reduced in size, such as by granulation in a wet grinding or milling process. In any of the various aspects, and depending upon the type of furnace used, cleaned glass monoliths, glass chips or granulated glass (e.g., granulates or flakes) may be subjected to particle size reduction according to attrition methods known in the art, such as, for instance, ball mills, to produce a frit or powder of the desired particle size. In some aspects, such as when the enamel composition is in the form of a powder, the average particle size of the powder is about 1 micron, about 5 microns, about 10 microns, about 25 microns, about 50 microns, about 75 microns, about 100 microns, and ranges thereof, such as from about 1 to about 100 microns, from about 1 to about 50 microns, from about 1 to about 25 microns, from about 5 to about 25 microns or from about 1 to about 10 microns.

The compositions according to the disclosure are intended for use as a cover coat. The compositions can be applied like any of the known cover coat porcelain enamels for use on sheet steel. For example, the compositions can be applied directly onto pickled, nickel-coated steel, ground coated steel, or onto cast iron substrates. The compositions can be applied over fired enamel ground coated substrates using known two-coat/two-fire processes, but in particular embodiments, the compositions can be applied over unfired ground coats using any of the known two-coat/one-fire processes (e.g., wet/wet, wet/dry, and dry/dry).

In one or more embodiments, methods according to embodiments herein may include application of a ground coat and a cover coat, such as where the ground coat is a glass coating system as described herein, and is applied to the substrate, followed by application of one or more cover coats. The one or more cover coats, for example, may be provided to form a compatibilizing layer between the glass coating system and the matrix material. The sintering of the base and cover coats may thus provide for a glass coating composition having an inner layer, formed from a glass coating system according to embodiments herein that is well suited for bonding to a substrate surface, and an outer layer, formed from a frit or powder composition that is well suited for bonding to the matrix material. It is noted that the sintering process may result in some blending of the base coat and cover coat proximate the interface(s) of the compositions; however such blending of the layers forms a contiguous structure, where the properties of the contiguous structure proximate the substrate differ from the properties of the contiguous structure that are to be disposed proximate the matrix material. When multiple layers or coats are applied to form the glass coating system, the system may be formed by a multiple coat one-fire process or may be formed by a multiple coat multiple fire process. When multiple layers or coats are applied to form the porcelain enamel coating, the system may be formed by a multiple coat one-fire process or may be formed by a multiple coat multiple fire process.

The porcelain enamel compositions can be applied using conventional dry electrostatic application processes. The application rate of the compositions by dry electrostatic processes will vary widely according to the desired thickness of the resultant porcelain enamel cover coat. Typical application rates are from about 200 g/m2 to about 600 g/m2.

The porcelain enamel compositions according to the present disclosure can instead be applied by any of the known wet application processes such as spraying, dipping, flow coating, and electrodeposition. In one or more embodiments, the compositions are dried prior to firing when the compositions are applied using a wet application process. Drying is typically accomplished using heat or other conventional production methods. The application rate of the compositions by wet application processes will vary depending upon the desired thickness of the resulting fired enamel cover coat. For example, a fired enamel cover coat having a thickness of about 120 Φm can be obtained when the application rate of the wet enamel composition is about 400 g/m2.

The enamel compositions according to the present disclosure may be fired at a temperature of from about 770 to 900° C. for about 2 to about 8 minutes. It will be appreciated that other firing times and temperatures could be used.

Upon firing, the formed porcelain enamel coating may have a composition (measured at the surface by a non-destructive method such as, for example, by x-ray fluorescence, scanning electron microscope, x-ray diffraction, energy dispersive x-ray spectroscopy, or the like) with the following components: $Na_2O$ in an amount ranging from about 10-20 wt %, $K_2O$ in an amount ranging from about 3-10 wt %, $Al_2O_3$ in an amount ranging from about 10-20 wt %, $SiO_2$ in an amount ranging from about 5-35 wt %, $P_2O_5$ in an amount ranging from about 10-25 wt %, ZnO in an amount ranging from about 1-5 wt, MnO in an amount ranging from about 0-2 wt % (depending on desired color), CoO in an amount ranging from about 0-5 wt % (depending on desired color), NiO in an amount ranging from about 0-5 wt % (depending on desired color), CuO in an amount ranging from about 0-5 wt % (depending on desired color), $Fe_2O_3$ in an amount ranging from about 0-8 wt % (depending on desired color), $ZrO_2$ in an amount ranging from about 0-10 wt %, $TiO_2$ in an amount ranging from about 0-3 wt % (depending on desired color and opacity), CaO in an amount ranging from about 0-2 wt %, and SrO in an amount ranging from about 0-3 wt %. It is also envisioned that the composition may also include various lighter components such as $Li_2O$, $B_2O_3$, and F, although depending on the technique used to measure the surface, those components may not necessarily be able to be accurately measured without destruction of the coating, but would be detectable using destructive methods such as AAS or ICP in which the material is brought into solution. In one or more embodiments, the formed porcelain enamel composition may be substantially free of Ba (and BaO). Further, it is also noted that depending on application methods, the composition could vary over the entire cooking surface, but any portion of a cooking surface having the claimed composition would be captured by the below claims. It is also recognized that the composition of the entire thickness of the coating may vary, particularly if applied onto a ground coat. Thus, the exposed surface of the coating may have the presently claimed composition whereas a depth below the surface may have a differing composition.

Upon firing, the porcelain enamel compositions according to the present disclosure form a porcelain enamel cover coat from which baked-on foods can be removed without the need for pyrolysis or highly alkaline cleaners. The porcelain enamel compositions according to the disclosure are particularly well-suited for application on the interior surfaces of oven cavities, dripping pans, cookware, and other articles that are exposed to the risk of baked-on food soiling, including microwave ovens. The fired enamel cover coats can be produced in a wide range of colors, including colors such as blue, brown, and green, by varying the pigments included as mill additions. It is also envisioned that the other mill additions such as clay, bentonite, magnesium carbonate, potassium nitrite, potassium carbonate, sodium aluminate, boric acid, and inorganic materials, such as zirconia, alumina, alumina metaphosphate, spodumene, and feldspar can also be added to the composition in order to modify the texture and/or to adjust the roughness of the fired porcelain enamel.

The fired porcelain enamel coating according to the disclosure may be scratch resistant, stain resistant, and maintain their easy-to-clean properties over many heating cycles. In addition, baked-on food can be easily removed from the enamel coat without the need for high temperature heating cycles or caustic chemical cleaners. Most baked-on foods can be removed from the fired enamel coats using hot water. In a particularly preferred cleaning technique, surfaces in accordance with the invention having baked-on food residue may be exposed to hot water vapor, such as having a temperature of at least 95° C., or about 110° C. for at least about 3, 5, or 10 minutes. Greater temperatures up to 250° C. such as those conventionally used in cooking may also be used if desired. Such surfaces can also be exposed to liquid water which is warm, hot or at the noted temperatures for the noted time periods. Soiled vertical surfaces may be wetted (such as with a sponge or spray bottle) prior to the steam cycle. After such exposure, the food or food residue can be easily cleaned off the surface(s) of the cooking surface. As noted, the cleaning efforts do not require the use of harsh or caustic cleaning agents or exposure to much greater temperatures such as associated with pyrolysis.

Example

A 4 inch by 6 inch test place having an porcelain enamel cover coat thereon was soiled with four different food samples: 1) 0.34 grams of shredded KRAFT cheddar cheese, 2) 0.64 grams of RAGU pizza sauce (or equivalent), 3) 0.67 grams of cherry pie filling, and 4) 0.50 grams of mash of various foods, the mash prepared as a blended mixture of ¼ lb ground beef (75% lean and 25% fat), ½ cup grated cheddar cheese, ½ cup whole milk, ½ cup white granulated sugar, ½ cup cherry juice, 2 T dry, uncooked instant tapioca, 1 raw egg, 2 T all purpose flour, and ½ cup tomato juice.

Following placement of each of the four foods onto the test place, the plates were baked in a pre-heated oven for 1 hour at 425° F. After the plate was allowed to cooled to room temperature, the excess soil was scraped from the test place with a plastic spatula. Then, 16 ounces of room temperature de-ionized or filtered water was placed in the bottom of an oven tray and the test plate was placed in the oven. The oven was heated as shown in the temperature profile shown in FIG. 1 and allowed to cool down to room temperature. Following the cooling down the test plates were removed and cleaned with the same spatula as used before. The steam effect inside the oven during the cleaning process loosens the soil residue from the enameled surface to allow for easy cleaning. FIGS. 2-5 show images of the food on the test plate a) prior to baking the foods (in FIG. 2), b) after baking the foods (in FIG. 3), c) after a steam cycle (in FIG. 4), and d) after soil removal (in FIG. 5). In each of these images, the soils include (from the top of the image moving to the bottom of the image: 1) cheese, 2) mash, 3) cherry pie filling, and 4) pizza sauce.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A porcelain enamel composition, comprising:
    a glass component including:
        at least one alkali oxide in an amount ranging from about 6 to 21 wt %,
        $SiO_2$ in an amount ranging from about 20 to 50 wt %,
        ZnO in an amount ranging from about 1.5 to 10 wt %,
        $Al_2O_3$ in an amount ranging from about 5 to 20 wt %,
        F in an amount ranging from greater than 0 to 10 wt %,
        $B_2O_3$ in an amount ranging from about 0.1 to 20 wt %, and
        $P_2O_5$ in an amount ranging from about 5 to 30 wt %, and
        wherein the porcelain enamel composition is substantially free of BaO,
        all weight percentages expressed relative to the enamel composition.

2. The porcelain enamel composition of claim 1, wherein the at least one alkali oxide comprises $Na_2O$ in an amount ranging from 5-20 wt % and $K_2O$ in an amount ranging from about 1 to 15 wt %.

3. The porcelain enamel composition of claim 2, further comprising $Li_2O$ in an amount ranging from greater than 0 to 7 wt %.

4. The porcelain enamel composition of claim 1, further comprising at least one of MnO, CoO, NiO, $Fe_2O_3$ or CuO.

5. The porcelain enamel composition of claim 4, wherein, when present: MnO is present in an amount ranging from greater than 0 to 5 wt %, CoO is present in an amount ranging from greater than 0 to 8 wt %, NiO is present in an amount ranging from greater than 0 to 5 wt %, $Fe_2O_3$ is present in an amount ranging from greater than 0 to 8 wt %, and/or CuO is present in an amount ranging from greater than 0 to 5 wt %.

6. The porcelain enamel composition of claim 1, wherein a total combined amount of $Al_2O_3$, $SiO_2$, $P_2O_5$, and ZnO ranges from about 50 to about 75 wt % of the porcelain enamel composition.

7. The porcelain enamel composition of claim 1, wherein the glass component further includes $TiO_2$ in an amount ranging from greater than 0 to 8 wt %.

8. The porcelain enamel composition of claim 1, wherein the glass component further includes $ZrO_2$ in an amount ranging from greater than 0 to about 15 wt % of the porcelain enamel composition.

9. The porcelain enamel composition of claim 1, wherein the glass component has alkaline earth oxides in an amount of no more than 3 wt % of the porcelain enamel composition.

10. A method of forming a porcelain enamel coating on a substrate, comprising:

depositing a layer of the porcelain enamel composition of claim 1 on the substrate; and
firing the layer to thereby form a porcelain enamel coating on the substrate.

11. The method of claim 10, wherein the substrate comprises a ground coat layer thereon such that the layer of the porcelain enamel composition is deposited on the ground coat layer.

12. The method of claim 11, wherein the ground coat layer and layer of porcelain enamel composition are fired in a single step.

13. The method of claim 10, wherein the porcelain enamel composition is deposited as a dry powder.

14. The method of claim 10, wherein the firing occurs at a temperature ranging from about 770 to 900° C.

15. A method of cleaning food residue from a cooking surface comprising a porcelain enamel coating formed from the porcelain enamel composition of claim 1, comprising:
    heating the cooking surface to a temperature of less than about 250° C. in the presence of water vapor or liquid water; and
    wiping the food residue off the cooking surface without application of a caustic cleaning agent.

16. The porcelain enamel composition of claim 1, wherein MnO is present in an amount ranging from 0.1 to 5 wt %.

17. The porcelain enamel composition of claim 1, wherein the at least one alkali oxide comprises $Na_2O$ in an amount ranging from 10-15 wt % and $K_2O$ in an amount ranging from about 5 to 14 wt %.

18. A porcelain enamel composition, comprising:
    a glass component including:
        at least one alkali oxide in an amount ranging from about 6 to 21 wt %,
        $SiO_2$ in an amount ranging from about 20 to 50 wt %,
        ZnO in an amount ranging from about 1.5 to 10 wt %,
        $Li_2O$ in an amount ranging from greater than 0 to 7 wt %,
        $Al_2O_3$ in an amount ranging from about 5 to 20 wt %,
        $B_2O_3$ in an amount ranging from about 0.1 to 20 wt %, and
        $P_2O_5$ in an amount ranging from about 5 to 30 wt %,
        wherein the porcelain enamel composition is substantially free of BaO, and
        wherein the at least one alkali oxide comprises $Na_2O$ in an amount ranging from 5-20 wt % and $K_2O$ in an amount ranging from about 1 to 15 wt %,
        all weight percentages expressed relative to the enamel composition.

19. A porcelain enamel composition, comprising:
    a glass component including:
        at least one alkali oxide in an amount ranging from about 6 to 21 wt %,
        $SiO_2$ in an amount ranging from about 20 to 50 wt %,
        ZnO in an amount ranging from about 1.5 to 10 wt %,
        $Al_2O_3$ in an amount ranging from about 5 to 20 wt %,
        $ZrO_2$ in an amount ranging from greater than 0 to about 15 wt %,
        $B_2O_3$ in an amount ranging from about 0.1 to 20 wt %, and
        $P_2O_5$ in an amount ranging from about 5 to 30 wt %,
        wherein the porcelain enamel composition is substantially free of BaO,
        all weight percentages expressed relative to the enamel composition.

20. A porcelain enamel composition, comprising:
    a glass component including:

at least one alkali oxide in an amount ranging from about 6 to 21 wt %,
$SiO_2$ in an amount ranging from about 20 to 50 wt %,
ZnO in an amount ranging from about 1.5 to 10 wt %,
$Al_2O_3$ in an amount ranging from about 5 to 20 wt %,
$B_2O_3$ in an amount ranging from about 0.1 to 20 wt %, and
$P_2O_5$ in an amount ranging from about 5 to 30 wt %,
wherein the porcelain enamel composition is substantially free of BaO, and
wherein the glass component has alkaline earth oxides in an amount of no more than 3 wt % of the porcelain enamel composition,
all weight percentages expressed relative to the enamel composition.

* * * * *